United States Patent
Ellis et al.

(10) Patent No.: US 9,623,879 B2
(45) Date of Patent: Apr. 18, 2017

(54) SYSTEM FOR OPERATING VEHICLE IN DIFFERENT DRIVING MODES AND METHODS FOR SAME

(71) Applicant: Honda Motor Co., Ltd., Minato-ku, Tokyo (JP)

(72) Inventors: Nathaniel C. Ellis, Marysville, OH (US); Nicholas A. Scheufler, Dublin, OH (US); Andrew M. Bucci, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 14/182,320

(22) Filed: Feb. 18, 2014

(65) Prior Publication Data

US 2015/0232096 A1 Aug. 20, 2015

(51) Int. Cl.
*B60W 50/08* (2012.01)
*B60W 50/00* (2006.01)
*B60W 50/14* (2012.01)

(52) U.S. Cl.
CPC ........ *B60W 50/087* (2013.01); *B60W 50/082* (2013.01); *B60W 2050/0096* (2013.01); *B60W 2050/146* (2013.01)

(58) Field of Classification Search
CPC ... B60W 2050/0071; B60W 2050/021; B60W 50/08; B60W 50/14; B60W 50/087; B60W 50/082; B60K 37/00; B60Q 3/04
See application file for complete search history.

(56) References Cited

U.S. PATENT DOCUMENTS

| | | | |
|---|---|---|---|
| 5,632,502 A | 5/1997 | Oppitz et al. | |
| 6,810,314 B2 | 10/2004 | Tashiro et al. | |
| 6,879,898 B2 | 4/2005 | Ghoneim et al. | |
| 7,162,346 B2 | 1/2007 | Berry et al. | |
| 7,349,776 B2 | 3/2008 | Spillane et al. | |
| 8,229,642 B2 | 7/2012 | Post, II et al. | |
| 2007/0276549 A1* | 11/2007 | Hijikata | 701/1 |
| 2012/0203424 A1* | 8/2012 | Filev et al. | 701/36 |
| 2014/0350789 A1* | 11/2014 | Anker et al. | 701/41 |

FOREIGN PATENT DOCUMENTS

WO 2010037947 A1 4/2010

* cited by examiner

*Primary Examiner* — Yonel Beaulieu
(74) *Attorney, Agent, or Firm* — Kenealy Vaidya LLP

(57) ABSTRACT

A vehicle includes a control system, a selector, and a display. The selector is operable in one of a first selection mode and a second selection mode for selecting respective ones of a first driving mode and a second driving mode for the vehicle. The control system is configured to detect an improper vehicular condition for the second driving mode. When the vehicle is in the first driving mode and the selector is transitioned from the first selection mode to the second selection mode during the occurrence of the improper vehicular condition for the second driving mode, the control system is configured to facilitate display of a warning message on the warning display indicating the improper vehicular condition for the second driving mode and inhibit the vehicle from transitioning from the first driving mode to the second driving mode. A method is also provided.

15 Claims, 3 Drawing Sheets

US 9,623,879 B2

SYSTEM FOR OPERATING VEHICLE IN DIFFERENT DRIVING MODES AND METHODS FOR SAME

TECHNICAL FIELD

A vehicle includes a control system that facilitates operation of the vehicle in different driving modes.

BACKGROUND

Some conventional vehicles are equipped with a driving mode selector that facilitates occupant-selection of different driving modes for the vehicle. Selecting from among the different driving modes changes certain operating characteristics of the vehicle to accommodate different types of driving.

SUMMARY

In accordance with one embodiment, a vehicle comprises a control system, a selector, and a display. The selector is in electronic communication with the control system. The selector is operable in one of a first selection mode and a second selection mode for selecting respective ones of a first driving mode and a second driving mode for the vehicle. The display is in electronic communication with the control system. The control system is configured to detect an improper vehicular condition for the second driving mode. When the vehicle is in the first driving mode and the selector is transitioned from the first selection mode to the second selection mode during the occurrence of the improper vehicular condition for the second driving mode, the control system is configured to facilitate display of a warning message on the warning display indicating the improper vehicular condition for the second driving mode and inhibit the vehicle from transitioning from the first driving mode to the second driving mode.

In accordance with another embodiment, a method for operating a vehicle is provided. The method comprises receiving, by a control system from a selector, a desired driving mode, and detecting, by the control system, an improper vehicular condition for the desired driving mode. The method further comprises inhibiting, by the control system, operation of the vehicle in the desired driving mode during the existence of the improper vehicular condition, and displaying, by the control system, a first warning message indicating the improper vehicular condition.

In accordance with yet another embodiment, a vehicle comprises a primary controller and at least one subsystem controller. The primary controller is configured to detect operational conditions of the vehicle and automatically transition the vehicle between a first driving mode and a second driving mode based upon the operational conditions. The at least one subsystem controller is for controlling a vehicle subsystem. The at least one subsystem controller is in electronic communication with the primary controller. The at least one subsystem controller is configured to transmit an inhibit indicator to the primary controller indicating the occurrence of an improper vehicular condition for the second driving mode. When the vehicle is in the first driving mode, the primary controller is inhibited from automatically transitioning the vehicle into the second driving mode in response to the inhibit indicator.

BRIEF DESCRIPTION OF THE DRAWINGS

Various embodiments will become better understood with regard to the following description, appended claims and accompanying drawings wherein:

DETAILED DESCRIPTION

Figure 1:
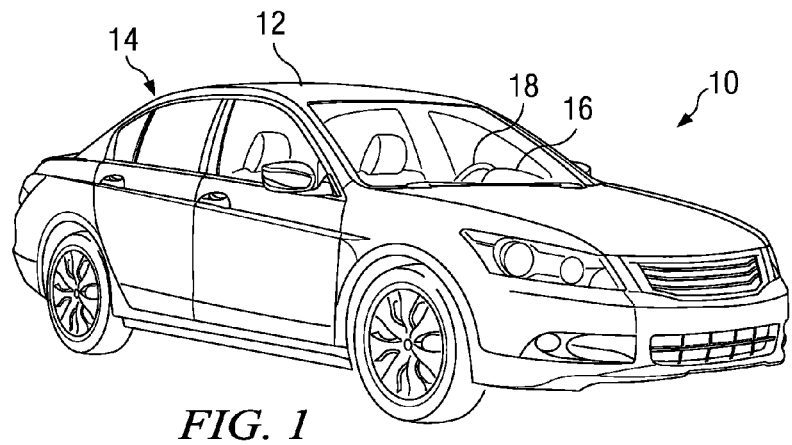
FIG. 1 is a perspective view of a vehicle, according to one embodiment.

Embodiments are hereinafter described in detail in connection with the views of FIGS. 1-4, wherein like numbers indicate the same or corresponding elements throughout the views. A vehicle 10 in accordance with one embodiment can comprise an automobile, as illustrated in FIG. 1, or any of a variety of other suitable vehicles, such as a recreational vehicle or a utility vehicle, for example. As illustrated in FIG. 1, the vehicle 10 can include a body structure 12. The body structure 12 can include body members and frame members which generally define an outer shell of the vehicle 10, and which can at least partially define a passenger compartment 14 of the vehicle 10. Passengers (e.g., a driver or operator of vehicle 10) and cargo can reside within the passenger compartment 14 during use of the vehicle 10.

Figure 2:
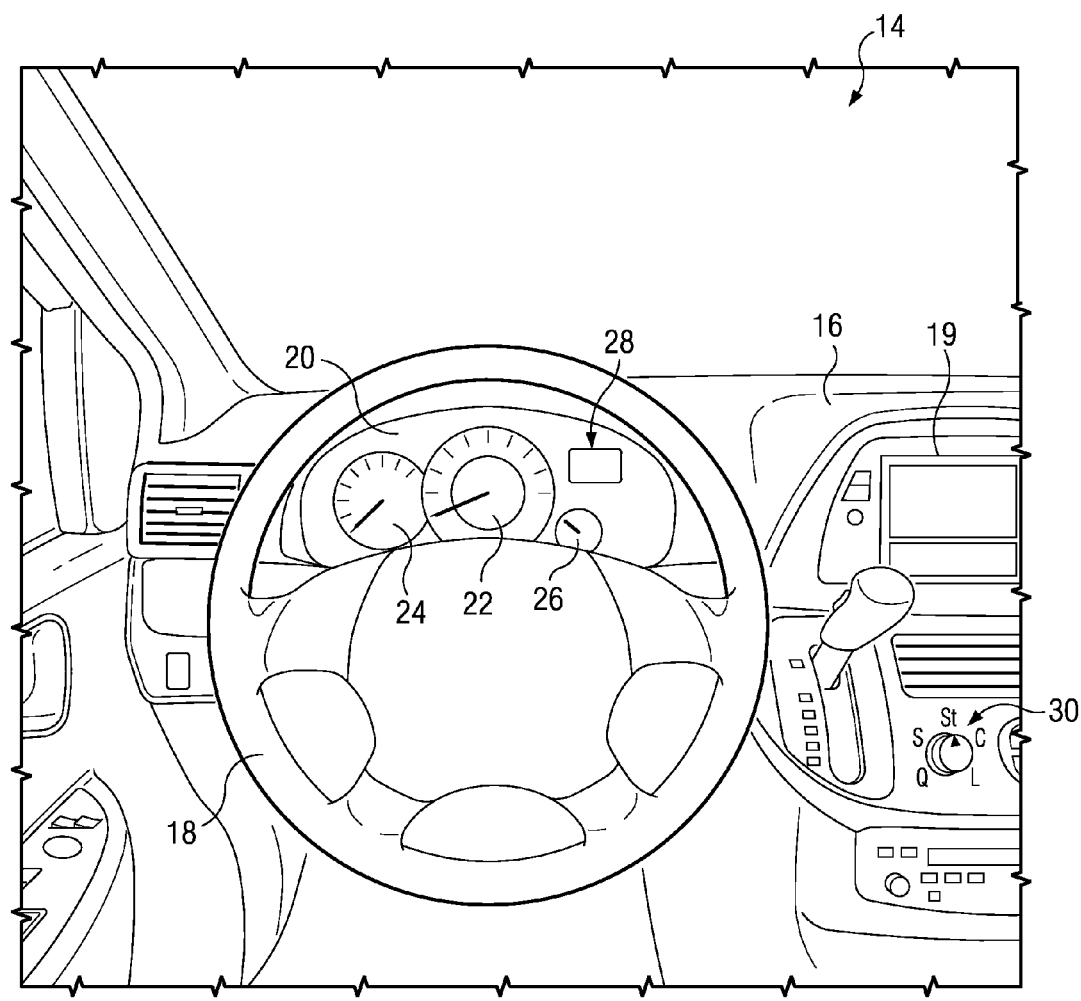
FIG. 2 is an interior view depicting a selector and an electronic instrument cluster having a display along with other features within a passenger compartment of the vehicle of FIG. 1.

A passenger seated within the passenger compartment 14 can facilitate steering of the vehicle 10 through use of a steering wheel 18 or other steering interface, such as shown in FIGS. 1-2. It will be appreciated that a dashboard 16 can support indicators and control devices for use by a passenger to facilitate control of the vehicle 10. For example, an infotainment system 19 is shown in FIG. 2 to be attached to the dashboard 16. The infotainment system 19 can be used by a passenger to facilitate control of one or more systems present upon the vehicle 10 such as, for example, a radio, a climate control system, a trip computer, seat and mirror position controls, a navigation system (e.g., a global positioning system ("GPS")), a telephone, and vehicle diagnostics. The steering wheel 18 can extend from the dashboard 16, as generally shown in FIGS. 1-2.

The vehicle 10 can include an electronic display that is configured to provide vehicular information to a passenger of the vehicle 10. In one embodiment, the vehicle 10 can include an electronic instrument cluster 20 housed within the dashboard 16 and provided behind the steering wheel 18. The electronic instrument cluster 20 can include a speedometer portion 22, a tachometer portion 24, and a fuel gauge portion 26 for displaying information about the vehicle's speed, engine speed, and on-board fuel amount, respectively. The electronic instrument cluster 20 can also include a warning display 28 that is configured to display improper vehicular conditions to a passenger, as will be described in further detail below.

The vehicle 10 can include a driving mode selector 30 that is operable in a plurality of different selection modes. A passenger can select from among the different selection modes to operate the vehicle 10 in different driving modes. In one embodiment, as illustrated in FIG. 1, the selector 30 can be a rotary switch that is rotatable between a five different selectable positions, Q, S, S+, C, and L, to facilitate selection from among a quiet mode, a sport mode, a sport plus mode, a circuit mode, and a launch mode, respectively.

Selecting among the different driving modes can change certain operating characteristics for the vehicle 10, such as, for example, engine valve timing (e.g., variable valve timing), transmission shift points, suspension stiffness, steering responsiveness, percentage of power distribution among the wheels, braking force, braking responsiveness, accelerator pedal/throttle responsiveness, overall vehicle height, and active spoiler deployment, to accommodate for different types of driving. When the vehicle 10 is in the quiet mode, the vehicle's operating characteristics can be set to accommodate normal "everyday" driving. When the vehicle 10 is in the sport mode, the vehicle's operating characteristics can be set to accommodate aggressive driving. When the vehicle 10 is in the sport plus mode, the vehicle's operating characteristics can be set to accommodate more aggressive driving than the sport mode. When the vehicle 10 is in the circuit mode, the vehicle's operating characteristics can be set to accommodate operation of the vehicle 10 on a race track. When the vehicle 10 is in the launch mode, the vehicle's operating characteristics can be set to enhance the ability of the vehicle 10 to accelerate from a stop. It will be appreciated that any of a variety of suitable alternative selectors can be provided that allow a passenger to select from among a plurality of different driving modes, such as, for example, a graphical user interface on the infotainment system 19.

Figure 3:
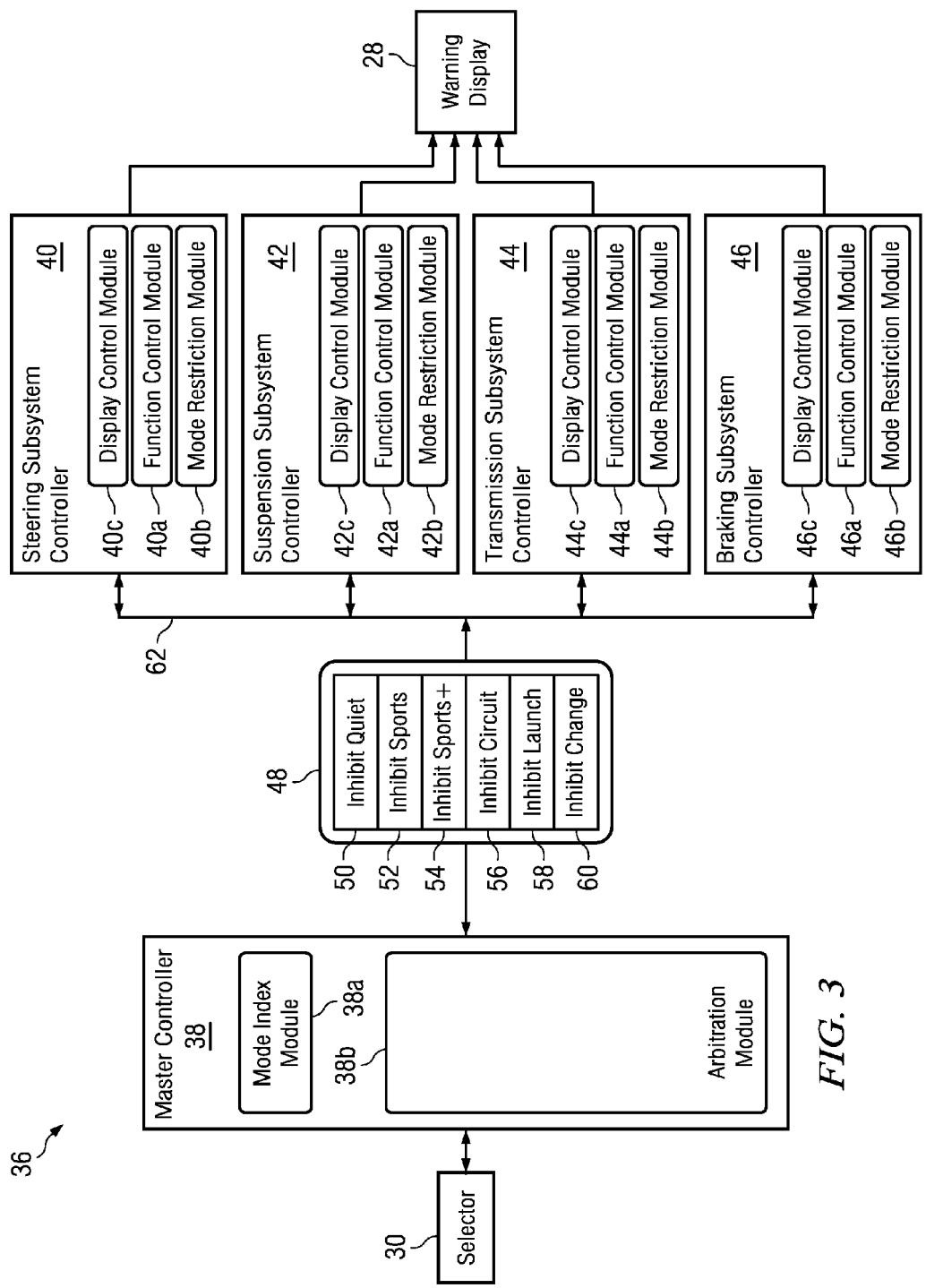
FIG. 3 is a block diagram depicting a control system of the vehicle of FIG. 1 associated with various components of the vehicle, according to one embodiment.

Referring now to FIG. 3, the vehicle 10 can include a control system 36 that includes a master controller 38, a steering subsystem controller 40, a suspension subsystem controller 42, a transmission subsystem controller 44, and a braking subsystem controller 46 (e.g., the subsystem controllers). The warning display 28, the selector 30, and each of the subsystem controllers 40, 42, 44, 46 can be in electronic communication with the master controller 38 via any of a variety of wired and/or wireless communication arrangements and through any of a variety of communication protocols (e.g., a controller area network (CAN)). During operation of the vehicle 10, each of the steering subsystem controller 40, the suspension subsystem controller 42, the transmission subsystem controller 44, and the braking subsystem controller 46 can be configured to control operation of the vehicle's steering system, suspension system, transmission, and braking system, respectively.

When a driving mode is selected with the selector 30, the master controller 38 and the subsystem controllers 40, 42, 44, 46 can cooperate with each other to facilitate operation of the vehicle 10 in the selected driving mode. In one embodiment, as illustrated in FIG. 3, the master controller 38 can include a mode index module 38a and an arbitration module 38b, and each of the subsystem controllers 40, 42, 44, 46 can comprise a respective function control modules 40a, 42a, 44a, 46a. When a passenger uses the selector 30 to change the current driving mode to a desired driving mode, the mode index module 38a can receive the desired driving mode from the selector 30. The mode index module 38a can then communicate the desired driving mode to the arbitration module 38b. If the operating conditions of the vehicle 10 are proper for the desired driving mode, as will be described in more detail below, the arbitration module 38b can then communicate with the function control modules 40a, 42a, 44a, 46a to set the operational characteristics of each respective vehicular subsystem in order to achieve the desired driving mode.

It is to be appreciated that the operating characteristics of each respective vehicular subsystem can be controlled according to certain predefined settings. These predefined settings can be used to set the operational characteristics of the subsystems of the vehicle 10 (e.g., ride height, power distribution, transmission shift points) in order to achieve the selected driving mode. In one embodiment, the predefined settings for each vehicular subsystem can be stored onboard the respective subsystem controllers 40, 42, 44, 46, such as, for example, within an onboard memory module (not shown). In such an embodiment, when a driving mode is selected with the selector 30, the mode index module 38a can notify each of the function control modules 40a, 42a, 44a, 46a of the selected driving mode. Each of the function control modules 40a, 42a, 44a, 46a can then control the respective subsystems according to the predefined settings to achieve the selected driving mode. In another embodiment, the predefined settings can be stored onboard the master controller 38. In such an embodiment, when a driving mode is selected, the mode control module 38a can communicate the predefined settings of the selected driving mode to each function control module 40a, 42a, 44a, 46a, and the function control modules 40a, 42a, 44a, 46a can set the operational characteristics of the respective vehicular subsystems accordingly. Although the master controller 38 is described as being in a master-slave relationship with each of the subsystem controllers 40, 42, 44, 46, the master controller 38 and subsystem controllers 40, 42, 44, 46 can be in any of a variety of control relationships that facilitate operation of the vehicle 10 in a selected driving mode.

When the passenger uses the selector 30 to change the current driving mode to the desired driving mode (e.g., by transitioning the selector 30 into the desired driving mode), the control system 36 can detect whether an improper vehicular condition exists for the desired driving mode. If an improper vehicular condition exists, the master controller 38 and the subsystem controllers 40, 42, 44, 46 can cooperate to inhibit the vehicle 10 from operating in the desired driving mode. An improper vehicular condition can be any vehicular condition and/or component failure for which operation in a desired driving mode is not recommended (e.g., due to the adverse effect of the improper vehicular condition on the integrity of the operation of the vehicle 10). For example, in order to permit operation of the vehicle 10 in any of the sport mode, the sport plus mode, or the launch mode, the transmission and the clutch(es) can be required to be at an appropriate temperature. If the transmission temperature and/or the temperature of the clutch(es) is/are improper (e.g., too cold or too hot), the master controller 38 can cooperate with the transmission subsystem controller 44 to inhibit operation of the vehicle 10 in the sport mode, the sport plus mode, and the launch mode until the respective temperatures of the transmission and the clutch(es) are proper. In another example, in order to permit operation of the vehicle 10 in the launch mode, the brakes must first be sufficiently applied. If the brakes are not sufficiently applied for the launch mode (e.g., based on the position of the brake pedal), the master controller 38 and the braking subsystem controller 46 can cooperate to inhibit operation of the vehicle 10 in the launch mode until the brakes are sufficiently applied. In yet another example, in order to operate the vehicle 10 in any of the driving modes, the ride height of the vehicle 10 must be set to an appropriate height. If the height of the vehicle 10 is not able to be set to an appropriate height for certain driving modes, the master controller 38 and the subsystem controllers 40, 42, 44, 46 can cooperate to inhibit the vehicle 10 from operating in those driving modes. In yet another example, if a vehicular subsystem is experiencing a component failure, such as the transmission being in a limp home mode, the master controller 38 and the subsystem controllers 40, 42, 44, 46 can cooperate to inhibit the vehicle 10 from operating in a desired driving mode that would be affected by the component failure. In some embodiments, the master controller 38 and the subsystem controllers 40, 42, 44, 46 can cooperate to inhibit any transition from the current driving mode in response to an improper vehicular condition.

Each of the subsystem controllers 40, 42, 44, 46 can be configured to monitor any of a variety of subsystem variables to determine whether an improper condition exists for a desired driving mode. The steering subsystem controller 40 can be configured to monitor a power steering fluid temperature, a steering fluid level, and/or steering system integrity, for example. The suspension subsystem controller 42 can be configured to monitor the ride height of the vehicle 10, the integrity of the suspension fluid (e.g., for an active or passive suspension system), and/or the integrity of the overall suspension system, for example. The transmission subsystem controller 44 can be configured to monitor a transmission fluid level, a transmission fluid temperature, and/or a current gear, for example. The braking subsystem controller 46 can be configured to monitor brake pad thickness, rotor temperature, brake fluid pressure, and/or a brake pedal position, for example. It is to be appreciated that to facilitate monitoring of the vehicular conditions, the master controller 38 and/or the subsystem controllers 40, 42, 44, 46 can receive information from various sensors which can transmit sensor information via the CAN bus or other suitable communication path. It is also to be appreciated that any of a variety of vehicular subsystems can be monitored to determine whether an improper vehicular condition is occurring for a desired driving mode.

In one embodiment, as illustrated in FIG. 3, the subsystem controllers 40, 42, 44, 46 can facilitate transmission of an inhibit indicator 48 to the master controller 38 indicating which of the driving modes should be inhibited during operation of the vehicle 10 based upon the occurrence of an improper vehicular condition. The inhibit indicator 48 can comprise a quiet mode inhibit data line 50, a sport mode inhibit data line 52, a sport plus mode inhibit data line 54, a circuit mode inhibit data line 56, a launch mode inhibit data line 58, and an inhibit change data line 60. When an improper vehicular condition is occurring, the appropriate inhibit data line 50, 52, 54, 56, 58 can be set to an inhibit state to indicate which of the driving modes to inhibit. In some embodiments, when an improper vehicular condition is occurring, the inhibit change data line 60 can be set to an inhibit state to prevent the vehicle 10 from being operated in a different driving mode. The inhibit indicator 48 can be communicated to the master controller 38 via a data bus 62, which in some embodiments can comprise the CAN bus. In some embodiments, each inhibit data line 50, 52, 54, 56, 58, 60 can be set to a binary one for an inhibit state and a binary zero for a non-inhibiting state.

The master controller 38 can be configured to selectively inhibit the vehicle from transitioning into the desired driving mode based upon the inhibit indicator 48. For example, when a passenger uses the selector 30 to change the current driving mode to a desired driving mode, the arbitration module 38b can receive the desired driving mode from the mode index module 38a. If the inhibit data line 50, 52, 54, 56, 58, 60 for the desired driving mode is in the inhibit mode, the arbitration module 38b can withhold the instructions to the function control module 40a, 42a, 44a, 46a that would operate the vehicle 10 in the desired driving mode. As a result, the vehicle 10 can be maintained in the current driving mode. Once the improper vehicular condition no longer exists, the vehicle 10 can be permitted to transition into the desired driving mode.

In one embodiment, the arbitration module 38b can inhibit the desired driving mode for a predetermined period of time. Once the predetermined period of time has elapsed, the arbitration module 38b can disregard the desired driving mode from the selector 30 and can maintain the vehicle 10 in the current driving mode. In such an embodiment, the arbitration module 38b can also be configured to change the state of the selector 30 after the predetermined period of time to indicate that the vehicle 10 has not transitioned into the desired driving mode. For example, when the passenger uses the selector 30 to change the current driving mode, an indicator (e.g., a light) on the selector 30 can be illuminated to indicate that the selector 30 has transitioned to the desired driving mode. Once the desired driving mode has been disregarded, the indicator on the selector 30 can be changed back to the current driving mode to indicate that the vehicle 10 is still in the current driving mode. In another embodiment, the arbitration module 38b can wait indefinitely until the inhibit data lines 50, 52, 54, 56, 58, 60 for the desired driving mode has cleared. In such an embodiment, once the passenger uses the selector 30 to change the current driving mode to the desired driving mode, the arbitration module 38b can transition the vehicle 10 into the desired driving mode once the inhibit data line 50, 52, 54, 56, 58 for the desired driving mode has been cleared.

Although the inhibit indicator 48 has been described to indicate improper vehicular conditions to the arbitration module 38b in real time, it will be appreciated that the arbitration module 38b can be additionally or alternatively configured to poll the subsystem controllers 40, 42, 44, 46 to determine whether an improper condition exists each time a desired driving mode is selected. For example, when a passenger uses the selector 30 to change the current driving mode to a desired driving mode, the arbitration module 38b can request information from the subsystem controllers 40, 42, 44, 46 about which of the driving modes are currently being inhibited. The subsystem controllers 40, 42, 44, 46 can then respond with an inhibit message (e.g., an inhibit indicator) that indicates which driving modes are being inhibited. The arbitration module 38b can then selectively inhibit the desired driving mode based upon the inhibit indicator from the subsystem controllers 40, 42, 44, 46.

When a desired driving mode is inhibited, the master controller 38 and the subsystem controllers 40, 42, 44, 46 can cooperate to facilitate display of a warning message on the warning display 28 (FIG. 2) that indicates the improper vehicular condition(s) that is/are inhibiting the desired driving mode. In one embodiment, as illustrated in FIG. 3, the subsystem controllers 40, 42, 44, 46 can comprise respective display control modules 40c, 42c, 44c, 46c. When an improper condition is occurring for a desired driving mode, the mode restriction module 40b, 42b, 44b, 46b associated with the improper condition can communicate the improper driving mode(s) and/or the improper condition to the respective display control modules 40c, 42c, 44c, 46c. When a desired driving mode is selected with the selector 30, the mode index module 38a can communicate the desired driving mode to the display control modules 40c, 42c, 44c, 46c. If the desired driving mode is being inhibited, the display control modules 40c, 42c, 44c, 46c associated with the improper condition can facilitate the display of the warning message onto the warning display 28. The warning message can notify the operator of the occurrence of the improper condition and, in some embodiments, can notify the operator of which driving mode is currently being inhibited. Once the improper condition no longer exists, the display control modules 40c, 42c, 44c, 46c can terminate the display of the warning message.

In one embodiment, the warning message can be displayed only when an inhibited driving mode is selected as the desired driving mode. In another embodiment, the warning message can be displayed when a driving mode is being inhibited irrespective of whether the inhibited driving mode has been selected with the selector 30. In such an embodiment, the operator can thus be made aware of the improper conditions and/or the inhibited driving modes prior to making a selection with the selector 30.

It is to be appreciated that in some embodiments, the improper condition can be resolved by the operator, such as by allowing the transmission to warm up or by applying additional braking force, for example. In other embodiments, the improper condition can be more persistent, such as when a component fails, and might only be resolved after a more significant delay, such as by making repairs to the failed component.

Figure 4:
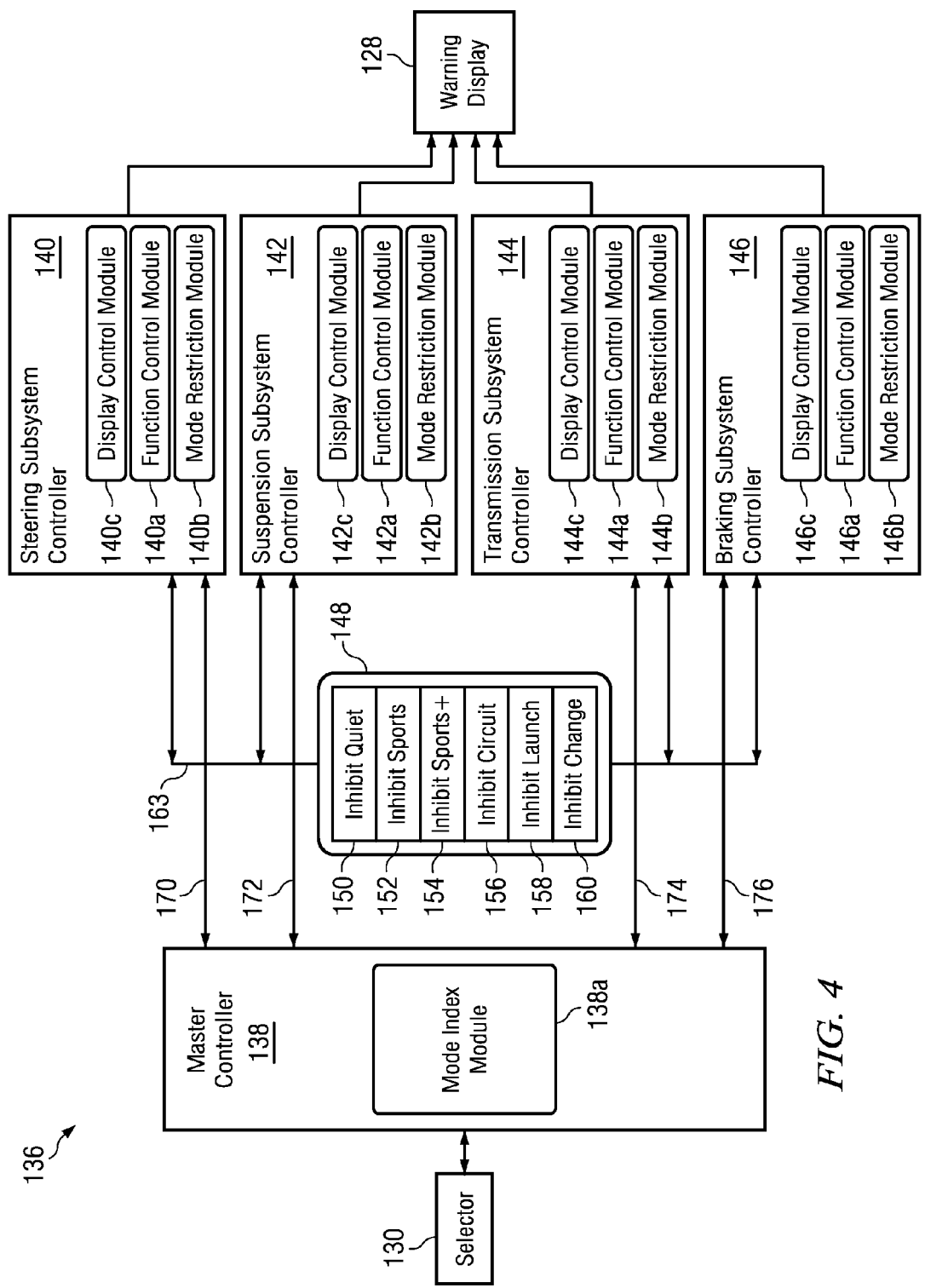
FIG. 4 is a plot depicting a block diagram depicting a control system according to another embodiment.

An alternative embodiment of a control system 136 is illustrated in FIG. 4 and is similar to or the same in many respects as the control system 36 illustrated in FIG. 3. For example, the control system 136 can include a selector 130, a master controller 138, a steering subsystem controller 140, a suspension subsystem controller 142, a transmission subsystem controller 144, and a braking subsystem controller 146. The master controller 138 can comprise a mode index module 138a. Each of the subsystem controllers 140, 142, 144, 146 can comprise a respective function control module 140a, 142a, 144a, 146a, a respective mode restriction module 140b, 142b, 144b, 146b, and a respective display control module 140c, 142c, 144c, 146c. An inhibit indicator 148 can facilitate inhibition of a desired driving mode and can comprise inhibit data lines 150, 152, 154, 156, 158, 160. The display control modules 140c, 142c, 144c, 146c can facilitate selective display of a warning message on a warning display 128.

However, each of the subsystem controllers 140, 142, 144, 146 can be in communication with each other via a data bus 163, and the mode restriction modules 140b, 142b, 144b, 146b can communicate the inhibit indicator 148 among the subsystem controllers 140, 142, 144, 146 to facilitate inhibition of a desired driving mode. When an improper vehicle condition is detected, the inhibit data lines 150, 152, 154, 156, 158, 160 of the inhibit indicator 148 can be individually and selectively set to an inhibit state by the mode restriction modules 140b, 142b, 144b, 146b to indicate which driving mode is being inhibited. When a desired driving mode is selected with the selector 130, the mode index module 138a can communicate the desired driving mode to the function control modules 140a, 142a, 144a, 146a. Each of the subsystem controllers 140, 142, 144, 146 can selectively inhibit operation of the vehicle 10 in the desired driving mode the inhibit indicator 148.

Although the driving mode has been described as being selected with the selector 30, it will be appreciated that in one embodiment, the driving mode can be automatically selected (e.g., by the master controller 36) to accommodate the current operating conditions of the vehicle 10. In such an embodiment, the automatic selection of the driving mode can be inhibited from transitioning in a driving mode in a similar manner as described above with respect to the selected driving mode from the selector 30. For example, when the master controller 36 wishes to automatically change the current driving mode to a desired driving mode (e.g., according to the current operating conditions) and an improper condition exists for the desired driving mode, the master controller 36 can delay transitioning of the vehicle 10 into the desired driving mode until the improper vehicular condition ceases to exists.

In one embodiment, the automatic transitioning of the vehicle 10 into a desired driving mode can be inhibited based upon the inhibit indicator 48 received from the subsystem controllers 40, 42, 44, 46. In such an embodiment, once the master controller 36 wishes to automatically change the current driving mode to a desired driving mode, the inhibit indicator 48 can be set to indicate which of the driving modes are being inhibited. If the master controller 36 wishes to automatically transition to one of the inhibited driving modes, the master controller 36 can delay that transition until the desired driving mode is no longer inhibited by the inhibit indicator 48.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A vehicle comprising:
   a control system comprising a primary controller and at least two subsystem controllers, each in communication with each other and the primary controller, the at least two subsystem controllers each being configured to control one of two or more separate vehicle subsystems;
   a selector in electronic communication with the control system, the selector being operable in one of a first selection mode and a second selection mode for selecting respective ones of a first driving mode and a second driving mode for the vehicle; and
   a warning display in electronic communication with the at least one subsystem controller configured to only display warnings; wherein:
   the primary controller transmits the selected driving mode to the at least two or more subsystem controllers;
   at least one of the at least two or more subsystem controllers detects an improper vehicular condition and transmits an inhibit indicator to the primary controller indicating at least one prohibited driving mode based upon the improper vehicular condition;
   the primary controller and at least one of the at least two subsystem controllers are each configured to compare the selected driving mode to the at least one prohibited driving mode, and
   when the selected driving mode and the at least one prohibited driving mode are the same, at least one of the at least two subsystem controllers is configured to facilitate display of a warning message on the warning display indicating the improper vehicular condition for the selected driving mode and, the primary controller is configured to inhibit the vehicle from transitioning to the selected driving mode.

2. The vehicle of claim 1 wherein the primary controller is configured to facilitate automatic transitioning to the prohibited driving mode once the improper vehicular condition ceases to exist.

3. The vehicle of claim 1 wherein the different driving modes are each one of a quiet mode, a sport mode, a sport plus mode, a circuit mode, and a launch mode.

4. The vehicle of claim 3 wherein the inhibit indicator comprises a quiet mode inhibit data line, a sport mode inhibit data line, a sport plus mode inhibit data line, a circuit mode inhibit data line, and a launch mode inhibit data line that indicate the occurrence of the improper vehicular condition for the quiet mode, the sport mode, the sport plus mode, the circuit mode, and the launch mode, respectively.

5. The vehicle of claim 1 wherein the selector comprises a rotary switch that is rotatable between the different modes.

6. The vehicle of claim 1 further comprising an electronic instrument cluster that comprises the warning display.

7. A method for operating a vehicle, the vehicle comprising a control system that comprises a primary controller and at least two subsystem controllers in communication with each other and the primary controller, the method comprising:
    receiving, by the primary controller from a selector, a selected driving mode;
    detecting, by at least one of the at least two subsystem controllers, an improper vehicular condition for the selected driving mode;
    determining, by at least one of the at least two subsystem controllers, at least one prohibited driving mode based upon the improper vehicular condition;
    transmitting, by at least one of the at least two subsystem controllers, an inhibit indicator to the primary controller indicating at least one prohibited driving mode based upon the improper vehicular condition;
    comparing, by the primary controller and at least one of the at least two subsystem controllers, the selected driving mode to the at least one prohibited driving mode;
    when the selected driving mode and the at least one prohibited driving mode are the same, inhibiting, by the primary controller, operation of the vehicle in the selected driving mode during the existence of the improper vehicular condition; and
    displaying, by at least one of the at least two subsystem controllers, a first warning message on a warning display configured to only display warnings indicating the improper vehicular condition.

8. The method of claim 7 wherein transmitting the inhibit indicator comprises setting of an inhibit data line to an inhibit mode, the inhibit data line being associated with the selected driving mode.

9. The method of claim 8 wherein setting of the inhibit data line to the inhibit mode comprises driving the inhibit data line to a single binary value.

10. The method of claim 7 further comprising displaying a second warning message indicating the selected driving mode that is being inhibited.

11. The method of claim 7 further comprising: inhibiting operation of the vehicle in the desired driving mode for a predetermined period of time; and once the predetermined time period has elapsed, disregarding the desired driving mode and operating the vehicle in a current driving mode.

12. A vehicle comprising:
    a primary controller configured to detect operational conditions of the vehicle and automatically transition the vehicle between different driving modes based upon the operational conditions; and
    at least two subsystem controllers each configured to control at least one of two separate vehicle subsystems, the at least two subsystem controllers being in electronic communication with each other and the primary controller, wherein each of the at least two subsystem controllers is configured to transmit an inhibit indicator to the primary controller indicating the occurrence of an improper vehicular condition and determine at least one prohibited driving mode based upon the improper vehicular condition; wherein:
    the primary controller selects a driving mode and transmits the selected driving mode to the at least two subsystem controllers;
    the primary controller and at least one of the at least two subsystem controllers are each configured to compare the selected driving mode to the at least one prohibited driving mode, and
    when the selected driving mode and the at least one prohibited driving mode are the same, at least one of the at least two subsystem controllers is configured to facilitate display of a warning message on warning display configured to only display warnings, indicating the improper vehicular condition for the selected driving mode, and the primary controller is configured to inhibit the vehicle from transitioning to the selected driving mode.

13. The vehicle of claim 12 wherein the inhibit indicator comprises a plurality of inhibit data lines, each of the inhibit data lines corresponding to the different driving modes.

14. The vehicle of claim 13 wherein the at least one subsystem controller is configured to selectively set each of the inhibit data lines in an inhibiting mode.

15. The vehicle of claim 14 wherein the at least one subsystem controller is configured to drive the inhibit data line to a single binary value to facilitate setting of the inhibit data line to the inhibiting mode.

* * * * *